Franklin T. Grimes    Impt in Lamps-B
110648    PATENTED JAN 3 1871
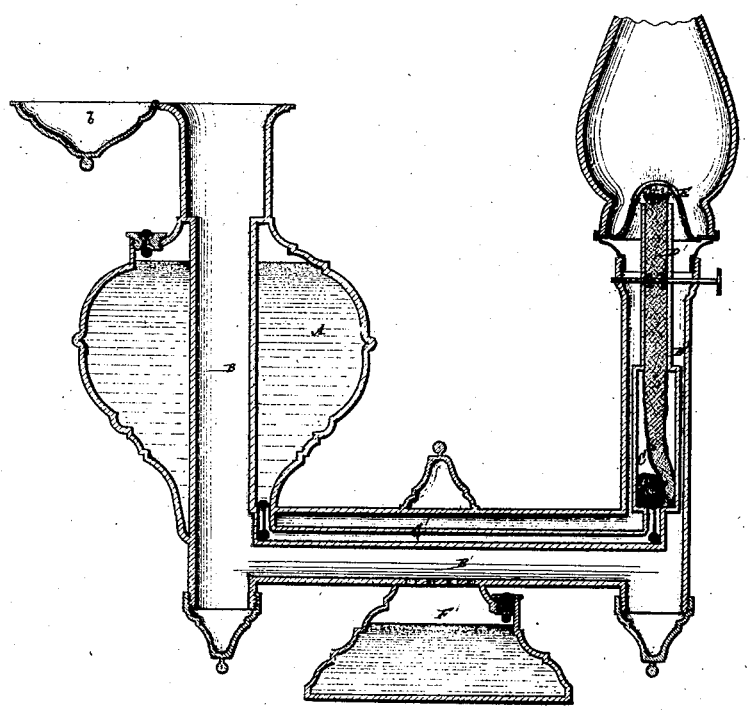
Witnesses
Fred: Haynes
H. Kimier
Franklin T. Grimes

United States Patent Office.

FRANKLIN T. GRIMES, OF LIBERTY, MISSOURI.

Letters Patent No. 110,648, dated January 3, 1871.

IMPROVEMENT IN LAMPS.

The Schedule referred to in these Letters Patent and making part of the same.

*To all whom it may concern:*

Be it known that I, FRANKLIN T. GRIMES, of Liberty, in the county of Clay and State of Missouri, have invented a new and useful Improvement in Lamps, of which the following is a full, clear, and exact description, reference being had to the accompanying drawing forming part of this specification, and which represents a sectional elevation of a lamp constructed in accordance with my improvement.

My invention relates to that description of lamps in which the wick-chamber is supplied with oil or fluid from a reservoir that is arranged outside of said chamber, or stands detached from it; and The invention consists in a certain arrangement of an air-supply pipe or passage to the flame relatively with the oil-reservoir and wick-chamber with its wick-tube, in such manner that when the lamp is burning the air to supply the flame is, in the course of its passage to the burner, made to first descend or pass in a downwardly direction through the oil-reservoir, and afterward to ascend around the wick-tube to the flame.

This arrangement establishes a current in which the cold and denser air is made to assume its natural downward course, keeping the oil in the reservoir cool, and thereby reducing the risk of an explosion, and afterward, as it approaches the flame, to assume its natural upward course of a heated current.

Referring to the accompanying drawing—

A represents the oil-reservoir; and

B, the air-tube or passage arranged to pass downwardly through said reservoir and from thence to or around the wick-chamber C from below, and up around the wick-tube D to the burner E.

Said air-passage may be furnished with a lid, *b*, at its top, to close it when the lamp is not in use.

F is a water-base or stand for support of the lamp, and which may communicate by suitable orifices with the lower branch of the air-passage B, so that while said base serves to give steadiness to the lamp when in use, in case of the lamp upsetting, the water will flow out of said base into the air-passage to extinguish the flame.

Said water-chamber F, as also the oil-reservoir A, may each be provided with valves to air-orifices made therein, or in their screw-caps or filling-nozzles, so constructed and operating that, while not excluding air from entering when the lamp is in an upright position, fluid is prevented from escaping in case of the lamp upsetting.

The wick-chamber C is supplied with oil from the reservoir A by a tube, G, arranged within the lower connecting-branch of the air-tube or passage, and provided at its opposite ends with a valve or valves that operate to admit of flow under ordinary conditions, and in an erect position of the lamp, but which close the communication between said reservoir and chamber should the lamp be upset; also which, or the one of them that controls ingress from the reservoir, closes in case of an explosion within the wick-chamber, and thereby prevents ignition extending to the oil-reservoir.

The arrangement herein described of the air-passage B insures, first, the descent of the cold and heavier air through the oil in the reservoir, keeping the oil cool, and afterward the ascent of the air under rarefaction of it by the flame, thus maintaining a most perfect circulation or current through the lamp, and contributing alike to its safety and brilliancy or steadiness in burning.

The same arrangement is applicable to other constructions of lamps employing a detached wick-chamber, as for instance to a students' lamp; and which is adjustable up or down on a vertical rod or post, under lock by a set-screw; and to chandeliers in which a central oil-reservoir is made to supply a series of branch lights arranged around it.

What is here claimed, and desired to be secured by Letters Patent, is—

The arrangement of the air-supply tube or passage B relatively to the reservoir A and wick-chamber C or its tube D, whereby the incoming air is made first to descend through the body of fluid in the reservoir, and afterward to ascend in its course or passage to the flame, substantially as specified.

FRANKLIN T. GRIMES.

Witnesses:
 FRED. HAYNES,
 ARTHUR KINNIER.